United States Patent
Licht et al.

(10) Patent No.: US 7,534,276 B2
(45) Date of Patent: May 19, 2009

(54) IN-SITU GASIFICATION OF SOOT CONTAINED IN EXOTHERMICALLY GENERATED SYNGAS STREAM

(75) Inventors: William Robert Licht, Allentown, PA (US); Shankar Nataraj, Allentown, PA (US); Xiang-Dong Peng, Orefield, PA (US); John Michael Repasky, Allentown, PA (US)

(73) Assignee: National Institute For Strategic Technology Acquisition and Commercialization

( * ) Notice: Subject to any disclaimer, the term of this patent is extended or adjusted under 35 U.S.C. 154(b) by 445 days.

(21) Appl. No.: 10/715,757

(22) Filed: Nov. 18, 2003

(65) Prior Publication Data

US 2005/0102901 A1 May 19, 2005

(51) Int. Cl.
| | |
|---|---|
| C01B 3/36 | (2006.01) |
| C10J 3/46 | (2006.01) |
| C10J 3/54 | (2006.01) |
| B01D 45/00 | (2006.01) |
| B01D 46/00 | (2006.01) |
| B01D 47/00 | (2006.01) |
| B01D 53/00 | (2006.01) |
| B01D 57/00 | (2006.01) |
| B03C 3/00 | (2006.01) |

(52) U.S. Cl. .................. 48/197 R; 423/215.5; 95/273; 95/278

(58) Field of Classification Search .............. 422/198; 48/197 R
See application file for complete search history.

(56) References Cited

U.S. PATENT DOCUMENTS

| 3,682,605 | A | * | 8/1972 | Wada ..................... 48/198.6 |
| 3,714,071 | A | * | 1/1973 | Michalko ..................... 502/8 |
| 5,415,673 | A | | 5/1995 | Hilton et al. |
| 5,937,652 | A | * | 8/1999 | Abdelmalek ................. 60/648 |
| 6,113,874 | A | * | 9/2000 | Kobayashi ................. 423/650 |
| 6,635,094 | B1 | | 10/2003 | Jahnke |
| 6,641,625 | B1 | * | 11/2003 | Clawson et al. ............ 48/127.9 |
| 2001/0045061 | A1 | * | 11/2001 | Edlund et al. ................. 48/76 |
| 2002/0106538 | A1 | * | 8/2002 | Lenglet et al. ................ 429/17 |
| 2002/0141910 | A1 | * | 10/2002 | Adiletta ..................... 422/171 |

FOREIGN PATENT DOCUMENTS

| CN | 1408637 | | 4/2003 |
| EP | 0 648 828 B1 | | 9/1997 |
| GB | 2099844 | | 12/1982 |
| JP | 50-40117 | | 12/1975 |
| JP | 55-161886 | | 12/1980 |
| JP | 32-42213 | | 10/1991 |
| JP | 05208134 A | * | 8/1993 |
| WO | WO 00/29323 | | 5/2000 |

OTHER PUBLICATIONS

Paul Scherrer Instittute, "Solar Process Technology,", *Energy 25* (2000), (Aug. 2, 1999),395-409.
"Gulf Coast Cooperative Application No. GCC/P2004/4011, Examination Report mailed Apr. 27, 2008", 4 pgs.
"Gulf Coast Cooperative Application No. GCC/P2004/4011, Search Report and Examination Report dated Jul. 8, 2007", 6 pgs.
"International Application Serial No. PCT/US04/38577, International Search Report mailed Feb. 8, 2006", 1 pg.
Werder, M., et al., "Life Cycle Assessment of the Conventional and Solar Thermal Production of Zinc and Synthesis Gas," *Energy 25*, (2000), 395-409.

* cited by examiner

*Primary Examiner*—Alexa D Neckel
*Assistant Examiner*—Matthew J Merkling
(74) *Attorney, Agent, or Firm*—Fish & Richardson P.C.

(57) ABSTRACT

A system is set forth for the exothermic generation of soot depleted syngas comprising (i) reacting a hydrocarbon-containing fuel with an oxygen containing gas in a first reactor to produce the syngas and byproducts comprising $CO_2$, $H_2O$ and soot; and (ii) introducing the syngas and byproducts into a second reactor containing a non-carbonaceous material that traps the soot for a sufficient time such that the majority of the byproduct soot is gasified via reaction with the byproduct $CO_2$ and/or $H_2O$ to produce a syngas stream that is depleted in the soot. The system is particularly suitable for the practice of heat exchange reforming wherein a portion of the heat is recovered from the soot depleted syngas stream and used as at least a portion of the heat to facilitate the additional production of syngas via the (endothermic) catalytic reforming of natural gas and steam.

9 Claims, No Drawings

IN-SITU GASIFICATION OF SOOT CONTAINED IN EXOTHERMICALLY GENERATED SYNGAS STREAM

BACKGROUND OF THE INVENTION

Synthesis gas comprising carbon monoxide and hydrogen (hereafter syngas) is commonly produced by the partial oxidation (POX) of a hydrocarbon-containing fuel (hereafter, the POX process). The POX process is a highly exothermic process and produces a syngas stream at temperatures typically in range of 2100 to 2800° F.

A key challenge in the POX process, especially for carbon heavy fuels, is the removal of the entrained solid carbon (hereafter soot) produced as an undesirable byproduct. In particular, the soot that is generated in the POX reactor will tend to foul conventionally designed heat exchangers that are used to recover a portion of the heat from the exothermically generated syngas stream. Although special boilers have been developed to process soot-containing syngas, these designs cannot be readily transferred to heat exchange reforming wherein a portion of the heat is recovered from the POX generated syngas stream and used as at least a portion of the heat to facilitate the additional production of syngas via the (endothermic) catalytic reforming of natural gas and steam. Thus a system which can remove soot from syngas at high temperature offers a key advantage to the practice of heat exchange reforming.

Typically, the soot is removed by quenching and scrubbing the syngas with water. See for example EPO 648 828 B1 and WO 00/29323, both assigned to Texaco Development Corporation.

Alternatively, JP 50040117 teaches directly filtering the syngas through a carbonaceous material that traps the soot for a sufficient time period such that the oxygen containing molecules that are also produced as byproduct in the POX process [i.e. $CO_2$ and $H_2O$] are given an opportunity to react with, and gasify, the soot. After such in-situ gasification of the soot, JP '117 introduces the syngas (or "reducing gas" as referred to therein) into a blast furnace.

A concern with the in-situ gasification scheme as taught in JP '117 is the use of a carbonaceous material as the material for trapping the soot and subsequently allowing it to be gasified by reaction with the byproduct $CO_2$ and/or $H_2O$. In particular, the carbonaceous material will be susceptible to the very same gasification reactions that the carbonaceous soot is intended to undergo (i.e. via reaction against the byproduct $CO_2$ and/or $H_2O$). Consequently, a carbonaceous material will require more frequent replacing than a non-carbonaceous material.

The present invention addresses this concern by using a non-carbonaceous material to trap the soot.

BRIEF SUMMARY OF THE INVENTION

The present invention is a system for the exothermic generation of syngas by the partial oxidation of a hydrocarbon-containing fuel comprising:

(i) reacting the hydrocarbon-containing fuel with an oxygen containing gas in a first reactor to produce the syngas and byproducts comprising $CO_2$, $H_2O$ and soot; and (ii) introducing the syngas and byproducts into a second reactor containing a non-carbonaceous material that traps the soot for a sufficient time such that the majority of the byproduct soot is gasified via reaction with the byproduct $CO_2$ and/or $H_2O$ to produce a syngas stream that is depleted in the soot.

DETAILED DESCRIPTION OF THE INVENTION

A key to the present invention is that the material used to trap the soot in the second reactor is a non-carbonaceous material. This is key because if a carbonaceous material were used (i.e. such as in JP 50040117), the material would be susceptible to the very same gasification reactions that the carbonaceous soot is intended to undergo (i.e. via reaction against the byproduct $CO_2$ and/or $H_2O$). Consequently, a carbonaceous material will require more frequent replacing than a non-carbonaceous material.

In a key embodiment of the present invention, the system further comprises a heat exchange reformer for recovering a portion of the heat from the soot depleted syngas stream and using at least a portion of the recovered heat to facilitate the additional production of syngas via the (endothermic) catalytic reforming of natural gas and steam.

Alumina is one example of the material that can be used as the non-carbonaceous material in the present invention. Various other refractory materials such as zirconia or lanthana could also be used, optionally in combination with alumina. In one embodiment of the present invention, the material is packed in the second reactor in the form of spherical particles to efficiently trap the soot without creating excessive pressure drop. The pressure drop and removal efficiency for an example reactor consisting of 2 feet of 3 inch diameter spheres and 1 foot each of 2 inch, 1 inch, and 0.5 inch diameter spheres has been calculated. With a superficial gas velocity of 7 ft/s, the pressure drop is 16 psi while the removal efficiency is such that 85% of the soot particles 21 microns in diameter are removed (larger soot particles are removed almost completely and smaller particle are passed through the bed almost completely). By arranging the spherical particles in this manner, soot particles of different sizes are trapped within each zone. This distributes the soot along the direction of flow and increases the capacity of the bed to hold soot without plugging.

Alternate packing shapes such as rings could also be used to allow more complete removal of a wider range of soot sizes while minimizing pressure drop. In addition, the non-carbonaceous material could also have a catalytic functionality to facilitate the gasification of the soot.

POX reactors can operate over a temperature range from about 1700 F to 3500 F; however, the most common operating range is from about 2100 to 2800 F. The system described here is preferentially operated in a temperature range from 2100 F to 2800 F. At higher temperatures, the hydrocarbon feed to the partial oxidation step is overly oxidized, resulting in less syngas and more byproduct $CO_2$ and $H_2O$. At lower temperatures, there is a substantial amount of unconverted hydrocarbon feed. Additionally at lower temperature, the quantity of soot held in the packing becomes too great and the packing plugs. The system described here is designed to operate at a steady state in which the gasification rate is equal to the rate at which the soot is trapped. For every 100 F drop in temperature between 2500 F and 2100 F the quantity of soot which must be held on the bed for the gasification rate to equal the amount of soot generated in the POX unit increases by approximately an order-of-magnitude.

It is within the scope of the present invention to include a fluid addition step between the first and second reactors. Potential benefits include managing the high temperatures and increasing the driving force for soot gasification. For example, steam could be added to the syngas and byproducts produced by the first reactor prior to introducing the syngas and byproducts into the second reactor.

The skilled practitioner will appreciate that there are many other embodiments of the present invention which are within the scope of the following claims.

The invention claimed is:

1. A process for the exothermic generation of syngas by the partial oxidation of a hydrocarbon-containing fuel comprising:
   (i) reacting the hydrocarbon-containing fuel with an oxygen containing gas in a first reactor to produce the syngas and byproducts comprising $CO_2$, $H_2O$ and soot;
   (ii) introducing the syngas and byproducts into a second reactor containing a non-carbonaceous material that traps the soot for a sufficient time such that the majority of the byproduct soot is gasified via reaction with the byproduct $CO_2$ and/or $H_2O$ to produce a syngas stream that is depleted in the soot; and,
   (iii) operating the second reactor at a steady state to maintain a substantially constant amount of soot trapped therein as the rate at which soot is gasified in the second reactor substantially equals the rate at which soot is trapped.

2. The process of claim 1 which further comprises:
   (iv) recovering a portion of the heat from the soot depleted syngas stream and using at least a portion of the recovered heat to facilitate the additional production of syngas via the (endothermic) catalytic reforming of natural gas and steam.

3. The process of claim 1 wherein substantially all of the byproduct soot is gasified in step (ii).

4. The process of claim 1 wherein the non-carbonaceous material comprises alumina.

5. The process of claim 1 wherein the non-carbonaceous material contained in the second reactor is in the form of spherical particles.

6. The process of claim 1 wherein the non-carbonaceous material contained in the second reactor is in the form of rings.

7. The process of claim 1 wherein the non-carbonaceous material contained in the second reactor has a catalytic functionality to facilitate the gasification of the soot.

8. The process of claim 1 wherein first and second reactors are operated in a temperature range from 2100 F to 2800 F.

9. The process of claim 1 wherein a fluid is added to the syngas and byproducts produced by the first reactor prior to introducing the syngas and byproducts into the second reactor.

* * * * *

UNITED STATES PATENT AND TRADEMARK OFFICE
CERTIFICATE OF CORRECTION

| | |
|---|---|
| PATENT NO. | : 7,534,276 B2 |
| APPLICATION NO. | : 10/715757 |
| DATED | : May 19, 2009 |
| INVENTOR(S) | : William Robert Licht et al. |

Page 1 of 1

It is certified that error appears in the above-identified patent and that said Letters Patent is hereby corrected as shown below:

In column 3, claim 1, line 16 – replace "soot;and," with -- soot; and, --

Signed and Sealed this

Twenty-ninth Day of June, 2010

David J. Kappos
*Director of the United States Patent and Trademark Office*